United States Patent
Gossen et al.

(10) Patent No.: US 10,250,751 B2
(45) Date of Patent: Apr. 2, 2019

(54) MOBILE CONFERENCE SYSTEM

(71) Applicants: Sennheiser Communications A/S, Ballerup (DK); Sennheiser electronic GmbH & Co. KG, Wedemark (DE)

(72) Inventors: Alex Gossen, Hannover (DE); Andre Scholz, Hildesheim (DE); Andreas Müller, Rees (DE); David Ditter, Hannover (DE); Dirk Engelking, Langenhagen (DE); Fabian Logemann, Hannover (DE); Ingo Battis, Wedemark (DE); Jean-Christophe Detay, Hannover (DE); Jens Tobien, Hannover (DE); Jens Werner, Hannover (DE); Jérôme-Etienne Zastrow, Burgwedel (DE); Marc Mangold, Hannover (DE); Mike Reitinger, Isernhagen (DE); Najib Khoury, Berlin (DE); Torben Christiansen, Copenhagen East (DK); Wienand Mensendiek, Bielefeld (DE); Jan-Phillip Röseler, Hildesheim (DE)

(73) Assignees: Sennheiser Communications A/S, Ballerup (DK); Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 16/064,257

(22) PCT Filed: Dec. 21, 2016

(86) PCT No.: PCT/EP2016/082099
§ 371 (c)(1),
(2) Date: Jun. 20, 2018

(87) PCT Pub. No.: WO2017/108903
PCT Pub. Date: Jun. 29, 2017

(65) Prior Publication Data
US 2019/0028590 A1   Jan. 24, 2019

(30) Foreign Application Priority Data

Dec. 23, 2015   (DE) .................. 10 2015 122 759

(51) Int. Cl.
*H04M 3/56* (2006.01)
*H04M 1/60* (2006.01)
(Continued)

(52) U.S. Cl.
CPC .......... *H04M 3/56* (2013.01); *H01M 2/1022* (2013.01); *H01M 2/30* (2013.01); *H04M 1/6033* (2013.01); *H04M 1/62* (2013.01)

(58) Field of Classification Search
CPC ... H04M 3/56; H04M 1/6033; H04M 2203/50
(Continued)

(56) References Cited

U.S. PATENT DOCUMENTS

2009/0264114 A1  10/2009  Virolainen et al.
2012/0014534 A1   1/2012  Bodley et al.
(Continued)

FOREIGN PATENT DOCUMENTS

EP   2 426 903   3/2012
EP   2 538 611   12/2012
EP   2 755 368   7/2014

OTHER PUBLICATIONS

International Search Report for Application No. PCT/EP2016/082099 dated Apr. 6, 2017.

*Primary Examiner* — Thjuan K Addy
(74) *Attorney, Agent, or Firm* — Haug Partners LLP

(57) ABSTRACT

A mobile conference system including a first mobile master hands-free unit and a second mobile slave hands-free unit, each having a microphone, a loudspeaker, a battery unit, an operating unit, a lighting unit, and a first transmitting/receiving unit for bidirectional wireless communication between the first and second mobile hands-free units. The (Continued)

first mobile hands-free unit includes a second transmitting/receiving unit for wireless bidirectional audio communication with an external unit. The first mobile hands-free unit is configured to wirelessly transmit audio signals received from the external unit via the second transmitting/receiving unit to the second mobile hands-free unit via the first transmitting/receiving unit, to mix audio signals received from the second mobile hands-free unit via the first transmitting/receiving unit with audio signals recorded via the at least one microphone of the first hands-free unit, and to wirelessly transmit said audio signals to the external unit via the second transmitting/receiving unit.

8 Claims, 7 Drawing Sheets

(51) Int. Cl.
  *H01M 2/30* (2006.01)
  *H01M 2/10* (2006.01)
  *H04M 1/62* (2006.01)

(58) Field of Classification Search
  USPC ............ 379/202.01, 201.01, 203.01, 420.01, 379/420.02, 420.03, 421; 455/416, 569.1
  See application file for complete search history.

(56) References Cited

U.S. PATENT DOCUMENTS

| | | |
|---|---|---|
| 2013/0316752 A1 | 11/2013 | Bodley et al. |
| 2015/0222990 A1* | 8/2015 | Hansen ................... H04R 3/04 381/103 |
| 2016/0195856 A1* | 7/2016 | Spero ..................... G06N 5/046 700/90 |

* cited by examiner

MOBILE CONFERENCE SYSTEM

The present application claims priority from International Patent Application No. PCT/EP2016/082099 filed on Dec. 21, 2016, which claims priority from German Patent Application No. DE 10 2015 122 759.2 filed on Dec. 23, 2015, the disclosures of which are incorporated herein by reference in their entirety.

FIELD OF THE INVENTION

It is noted that citation or identification of any document in this application is not an admission that such document is available as prior art to the present invention.

The present invention relates to a mobile conference system.

Conventional conference systems are typically hard-wired and require a complex initialization. Conference systems of this type can therefore be used in a restricted manner and can typically only be initialized by trained personnel.

In the priority-substantiating German patent application, the German Patent and Trademark Office has searched the following document: US 2009/0264114 A1.

SUMMARY OF THE INVENTION

It is an object of the invention to provide a mobile conference system which can be used flexibly and which can be initialized and started without major expenditure.

A mobile conference system is thus provided comprising a first mobile hands-free unit and at least one second mobile slave hands-free unit, which each have at least one microphone for recording audio signals, a loudspeaker for playing back audio signals to be played back, a battery unit for supplying energy, an operating unit, at least one lighting unit and a first transmitting/receiving unit for bidirectional wireless communication between the first and the second mobile hands-free unit. The first hands-free unit comprises a second transmitting/receiving unit for wireless bidirectional audio communication with an external unit. The first hands-free unit is configured to wirelessly transmit audio signals which were received from the external unit by means of the second transmitting/receiving unit, to the second mobile hands-free unit by means of the first transmitting/receiving unit. The first hands-free unit is configured to mix audio signals which were received from the second mobile hands-free unit by means of the first transmitting/receiving unit with audio signals recorded by means of the at least one microphone of the first hands-free unit and to wirelessly transmit said audio signals to the external unit by means of the second transmitting/receiving unit.

The mobile conference system according to the invention comprises a first mobile hands-free unit (master) and at least one second mobile hands-free unit (slave). The first mobile hands-free unit has an interface for external communication for example via a mobile telephone or via a fixed-line telephone connection. The first mobile hands-free unit (master) has a second wireless interface for wireless bidirectional communication with the at least one second mobile hands-free unit (slave). The second mobile hands-free unit (slave) has (like the first mobile hands-free unit (optionally) at least one microphone for recording an audio signal, at least one loudspeaker for playing back an audio signal to be played back, at least one operating element for operating the second mobile hands-free unit, a control unit for controlling the second mobile hands-free unit and a wireless communication interface for bidirectional communication with the first mobile hands-free unit. The first mobile hands-free unit receives the audio signals recorded by the microphones of the second mobile hands-free unit, which have been transmitted via the wireless interface. The first mobile hands-free unit receives an external audio signal via the external communications interface and transmits this audio signal wirelessly to the at least one mobile hands-free unit which plays back the audio signal or at least parts of the audio signal via the loudspeaker.

The first mobile hands-free unit and the second mobile hands-free unit have at least one lighting unit. The operation of these lighting units can be controlled by a control unit of the first mobile hands-free unit (master). In particular, the lights can be controlled centrally depending on a set operating mode.

According to a further aspect of the present invention, all the hands-free units can be muted by actuating a muting operating element. This can be displayed accordingly by the lighting units. To this end, the colour of the lighting units, the intensity of the lighting unit and/or the flashing of the lighting unit can vary as soon as a muting of the hands-free units is activated.

According to a further aspect of the present invention, the muting at each of the hands-free units can be activated and/or deactivated.

BRIEF DESCRIPTION OF THE DRAWINGS

Advantages and exemplary embodiment of the invention will be explained in detail hereinafter with references to the drawings.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
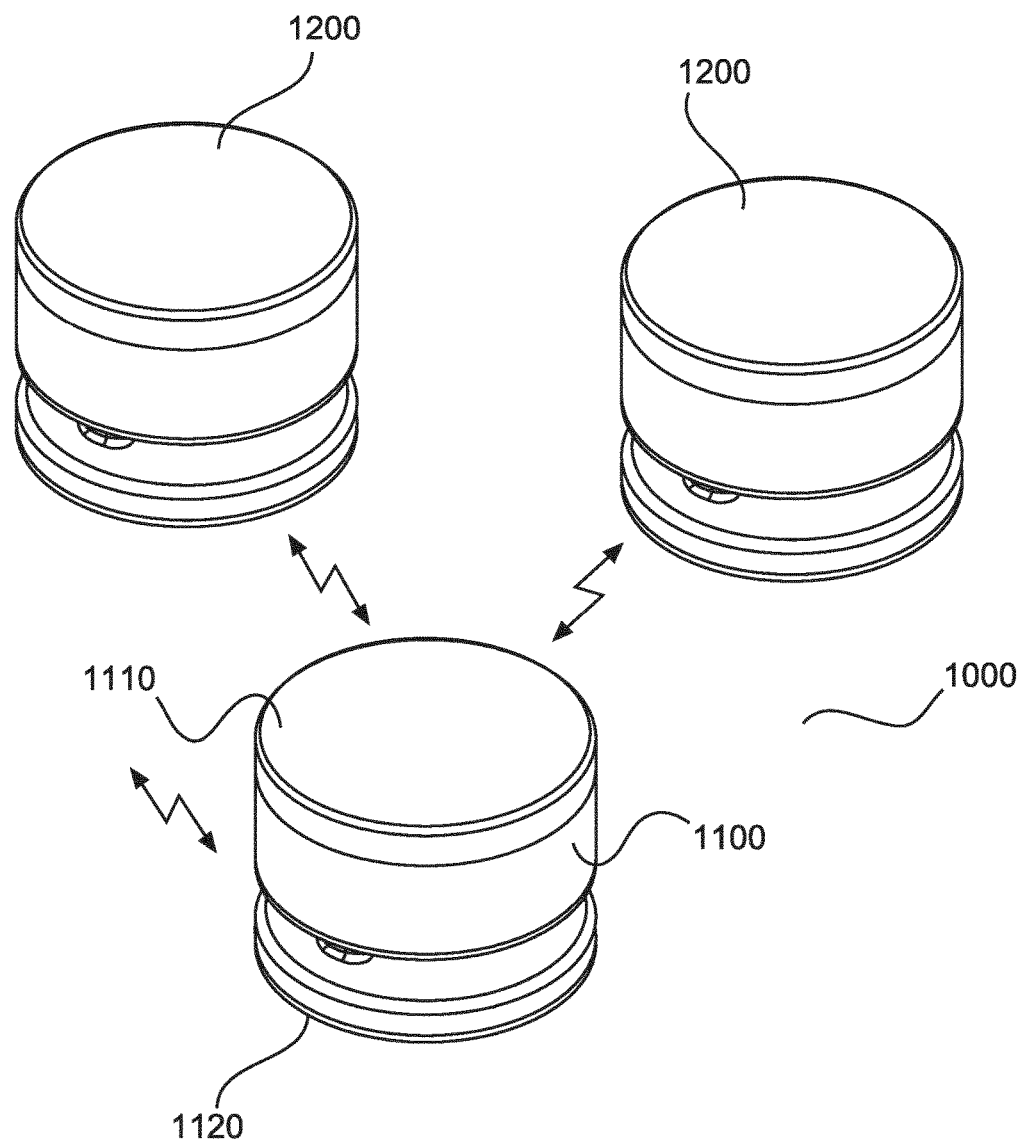
FIG. 1 shows a schematic diagram of a mobile conference system according to a first exemplary embodiment.

FIG. 1 shows a schematic view of a mobile conference system according to a first exemplary embodiment. The mobile conference system 1000 comprises a first mobile hands-free unit (master) 1100 and at least one further or second mobile hands-free unit (slave) 1200.

Figure 2:
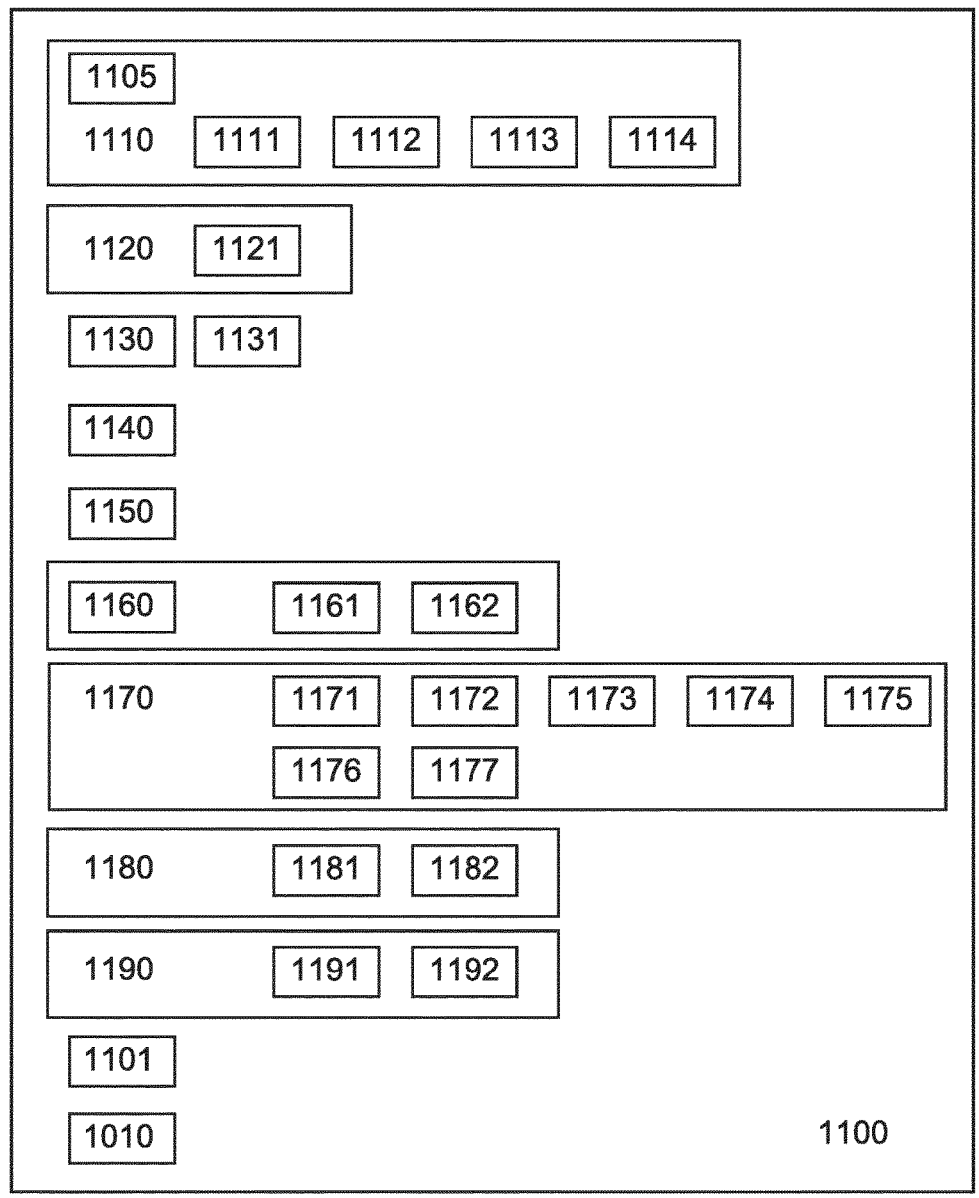
FIG. 2 shows a block diagram of a first mobile hands-free unit according to a second exemplary embodiment.

FIG. 2 shows a block diagram of a first mobile hands-free unit according to a second exemplary embodiment. The first mobile hands-free unit (master) 1100 comprises an operating unit 1110 with a first lighting unit 1111, a loudness operating element 1112, a muting operating element 1113 and/or a pairing operating element 1114. The first mobile hands-free unit 1100 comprises a base unit 1120 with a second lighting unit 1121, at least one microphone 1130, at least one loudspeaker 1140, at least one first transmitting/receiving unit 1150. The first transmitting/receiving unit 1150 can be a wireless interface for example based on the DECT standard and is used for communication between the first mobile hands-free unit (master) 1100 and the second mobile hands-free unit (slave) 1200. The first mobile hands-free unit (master) further comprises a second transmitting/receiving unit 1160 or a second wireless communication interface 1160. The second transmitting/receiving unit 1160 can comprise a wireless transmitting/receiving unit 1161, for example based on the WiFi protocol or the Bluetooth protocol and/or a wired transmitting/receiving unit 1162, for example, based on a USB connection, an AUX connection, a fixed-wire connection etc. The second transmitting/receiving unit 1160 is used for bidirectional transmission of audio signals between the conference system 1000 and an external remote communication unit such as, for example a smartphone.

The first mobile hands-free unit 1100 further comprises a control unit 1170 for controlling the operation of the first and second hands-free units 1100, 1200. The control unit 1170 can have a first lighting control unit 1171 for controlling the lighting units of the first and/or second mobile hands-free unit, a pairing unit 1172 for initializing and/or controlling a pairing between a mobile telephone and the first mobile hands-free unit. The control unit 1170 can further have a loudness control unit 1173, an operating element control unit 1174, a slave synchronization unit 1175, an operating mode control unit 1176 and/or a second lighting control unit 1177.

The first mobile hands-free unit 1100 has an audio mixing unit 1180 with a first audio activity recording unit 1181 for recording an audio activity via the internal interface 1150 for communication with the second mobile hands-free units 1200 and a second audio activity recording unit 1182 for recording an audio activity via the external interface 1160.

The first mobile hands-free unit 1100 has a control interface 1190 for the wireless bidirectional communication of control signals, in particular to the at least one second mobile hands-free unit 1200. The control interface 1190 can have an I²S unit 1191 and a slave control unit 1192. Optionally the control signals can be embedded in the audio data and thus the first mobile hands-free unit (master) 1100 can transmit control signals to the second mobile hands-free units (slave) 1200 via its transmitting/receiving unit 1150 and receive control signal from these. In this case, the control interface 1190 of the first mobile hands-free unit 1100 is therefore integrated in the first transmitting/receiving unit 1150.

Furthermore, the first mobile hands-free unit 1100 has a battery unit 1010 from which the hands-free unit 1100 can be supplied with electrical energy in a mobile manner.

Figure 3:
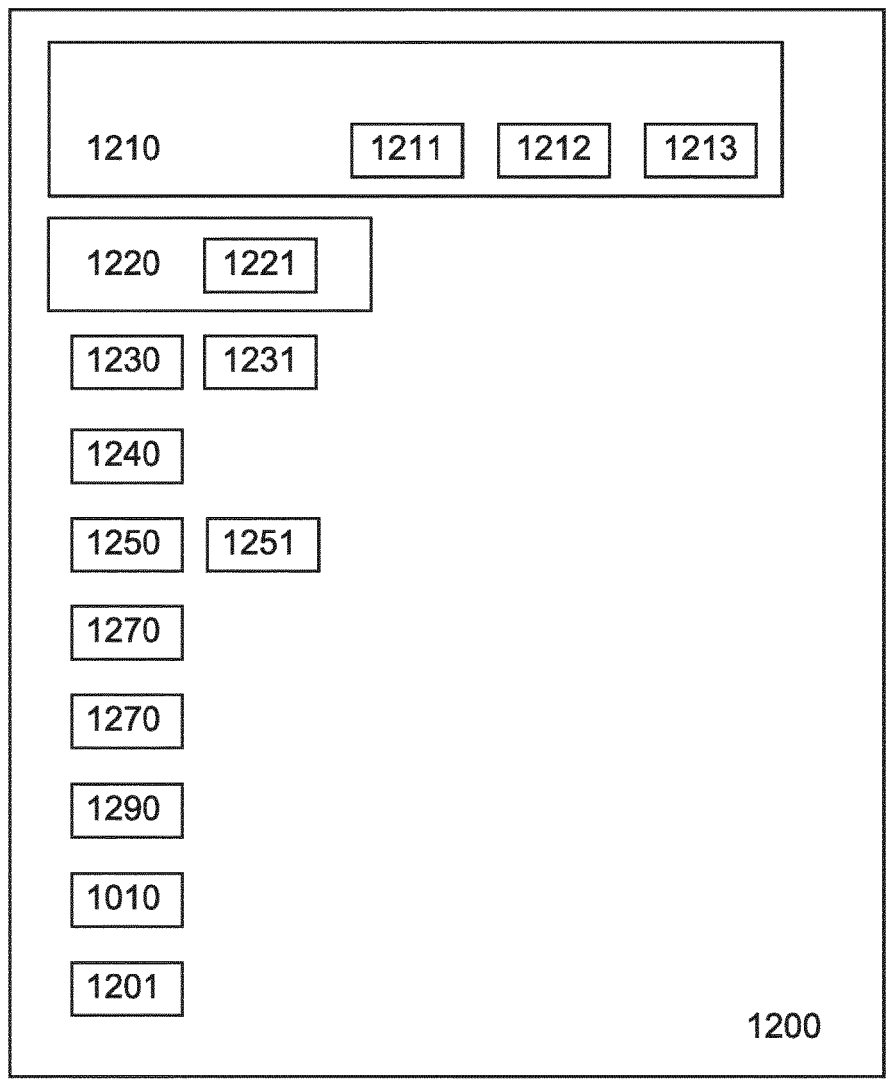
FIG. 3 shows a block diagram of a second mobile hands-free unit according to a third exemplary embodiment.

FIG. 3 shows a block diagram of a second mobile hands-free unit according to a third exemplary embodiment. The second mobile hands-free unit 1200, which is configured as slave, has an operating unit 1210 with a first lighting unit 1211, a loudness operating element 1212 and/or a muting operating element 1213. Furthermore, the second mobile hands-free unit 1200 has a base unit 1220 with a lighting unit 1221, at least one microphone 1230, at least one loudspeaker 1240, at least one transmitting/receiving unit or a wireless interface unit 1250 and/or a control unit 1270. The audio signals recorded via the microphone 1230 can be transmitted wirelessly to the first mobile hands-free unit 1100 via the transmitting/receiving unit 1250. Via the transmitting/receiving unit 1250 audio signals to be played back can be received wirelessly by the first mobile hands-free unit 1100 and played back via the at least one loudspeaker 1240. Control signals from the first mobile hands-free unit 1100 can be received via the transmitting/receiving unit 1250 or via a corresponding subunit such as, for example, a control signal receiving unit 1251. These signals can then be implemented by means of the control unit 1270. For example, the lighting unit 1211 and/or the lighting unit 1221 (e.g. when muting the hands-free units) can be activated or switched on and off. Since the control of the switching on and off of the lighting units 1211 and 1221 of the second mobile hands-free units comes from the control unit 1170 of the first mobile hands-free unit (master) 1100, the second mobile hands-free units (slaves) can flash according to the operating mode for example synchronously with the first mobile hands-free unit (master) 1100.

The second mobile hands-free unit 1200 also has a battery unit 1010 from which the hands-free unit 1200 can be supplied with electrical energy in a mobile manner. Optionally the second mobile hands-free unit 1200 has a control interface 1290 for wireless, bidirectional communication of control signals, in particular with the first mobile hands-free unit 1100. Optionally the control signals can be embedded in the audio data and thus the transmitting/receiving unit 1250 of the second mobile hands-free unit (slave) 1200 simultaneously serves as control interface 1290.

According to one aspect of the present invention, a common mute function can be provided for the entire conference system 1000 consisting of a first mobile hands-free unit (master) 1100 and at least one of the second mobile hands-free units (slave) 1200. The mute function is implemented here so that in a "muted" state none of the microphone signals recorded by the conference system 1000 are output to the external communication unit connected via the second transmitting/receiving unit 1160. The master unit 1100 contains the muting operating element 1113 and each slave unit 1200 contains a muting operating element 1213. If a muting operating element 1213 of a slave unit 1200 is actuated, the slave unit transmits this information in the form of a muting control command via the control interface 1290 of the slave unit to the control interface 1190 of the master unit. The master unit 1100 implements the mute function by interrupting the output of audio signals to the second transmitting/receiving unit 1160 of the master unit 1100 and thus interrupting the output of audio signals to the external communication unit for the entire conference system 1000. If instead the muting operating element 1113 of the master unit 1100 is actuated, the master unit can internally implement the mute function for the entire conference system 1000 by interrupting the output of audio signals to the second transmitting/receiving unit 1160 of the master unit 1100. In both cases the master unit can optionally additionally emit a corresponding control command to all connected slave units 1200, in order to notify the new "muted" state. This state can then be displayed both on the master unit 1110 via the relevant lighting unit 1111 and also on all connected slave units 1200 via relevant lighting units 1211 likewise. The deactivation of the mute function can be accomplished according to the activation of the mute function. Optionally the muting operating element 1113 of the master unit 1100 or a muting operating element 1213 of a connected slave unit 1200 can therefore be actuated and optionally by transmission of corresponding control commands the master unit will re-activate the audio output to the second transmitting/receiving unit 1160 of the master unit 1100. The "unmuted" state thus produced can again be displayed by transmission of corresponding control commands both on the master unit 1100 via the relevant lighting unit 1111 and also on all connected slave units 1200 via relevant lighting unit 1211 likewise. It is therefore possible to transfer the entire conference system 1000 via an arbitrary one of the participating muting operating elements 1113 or 1213 into the "muted" state and subsequently optionally transfer it back into the "unmuted" state via another one of the participating muting operating elements.

The operating unit 1110, 1210 of the first and second mobile hands-free unit 1100, 1200 can for example be configured at least partially as a touchpad. If for example a user actuates the pairing operating element 1114 and for example places his mobile telephone on the operating element 1110, the operating unit or some operating elements can then be deactivated for example by means of the operating element control unit 1174 of the control unit 1170 of the first mobile hands-free unit 1100 as long as the mobile telephone is placed on the operating unit 1110. This should avoid the operating elements 1112, 1113 being actuated unintentionally.

In particular, the central unit 1100 contains an operating unit 1110 via which the user can control its functions. For example, the loudness of the audio playback can be increased or reduced or a mute function can be provided for the microphone signal output to the external remote communication device. For convenient operation the operating unit 1110 is preferably provided on the upper side of the central unit 1100 (see FIG. 1), optionally in the form of a touchpad. Additionally the upper side of the central unit 1100 can be provided for example to place a smartphone thereon in order to carry out, for example a Bluetooth pairing via NFC (near field communication). In this case therefore the smartphone is placed on the operating unit 1110 of the central unit 1100. In order to prevent undesired actuations of the operating unit, an automatic deactivation of the operating unit 1110 can be provided which persists as long as the smartphone is located in the NFC range (a few centimeters) of the central unit.

A pairing operating element 1114 can be actuated for pairing a mobile telephone with the first mobile hands-free unit 1100. Then the mobile telephone to be paired can be placed, for example, on the operating unit 1110. The actuation of the pairing operating element 1114 can optionally be accomplished via NFC (near field communication). In this case, the mobile telephone is placed on the operating unit 1110 and an automatic actuation of the pairing operating element 1114 is initiated by a spatial approach of the mobile telephone to the first mobile hands-free unit 1100. Upon actuation of the pairing operating element 1114, a pairing unit 1172 can be activated. Furthermore an operating element control unit 1174 can be activated which can deactivate the touchpad 1110 during the pairing process so that this can prevent an accidental activation of one of the operating elements due to placement of a mobile telephone on the operating unit 1110.

According to one aspect of the present invention, the first and/or second mobile hands-free unit 1100, 1200 can each have a USB connection 1101, 1201 in the form of a USB socket via which the mobile hands-free unit can be supplied with energy. The mobile hands-free unit can thus be operated when the battery unit 1010 is empty.

According to one aspect of the present invention, the first and/or second mobile hands-free unit 1100, 1200 has at least two microphones 1130, 1131, 1230, 1231. In this case the first microphones 1130, 1230 can each be used to record a useful audio signal whilst for example the second microphones 1131, 1231 can each be used to record noise or interference audio signals. By means of these recorded interference audio signals, a reduction of interference in the mobile hands-free units 1100, 1200 can be achieved. Optionally the mobile hands-free units can have microphone arrays with a plurality of microphones, whose directional characteristics can optionally be adapted dynamically.

According to the invention, the first mobile hands-free unit (master) 1100 can receive a plurality of audio signals on a plurality of channels via the second wireless interface 1160. For example, various subscribers can each be assigned their own channel. Optionally the received (different) audio channels can then be played back by means of different second mobile hands-free units (slave) 1200. Thus, for example, a subscriber or the audio signal from him can be played back via one of the second mobile hands-free units 1200 or another subscriber can be played back via another mobile hands-free unit 1200. Optionally the loudness can be varied or adapted. This can in particular be accomplished so that the subscribers can identify from which audio source the speech comes. If more channels than second mobile hands-free units (slave playback devices) 1200 are provided, individual channels on the provided mobile hands-free units can be distributed by means of different loudnesses to the individual hands-free units in the sense of a balance regulation.

If therefore the first mobile hands-free unit 1100 receives a multichannel audio input signal from an external audio source via the second wireless interface 1160, the respective audio channels can be played back via individual second mobile hands-free units 1200. Alternatively to this, a plurality of channels can be played back via the second mobile hands-free units 1200.

A second communication interface 1160 of the first mobile hands-free unit 1100 can for example be coupled to a voice-over IP interface. Thus the subscribers of a conference can be connected to the conference for example via a voice-over IP interface. Optionally an optical feedback can also be produced by means of the lighting units of the mobile hands-free units when an audio signal is received on the audio channel which is played back by one of the second mobile hands-free units 1200.

According to one aspect of the present invention, the first mobile hands-free unit 1100 can mix together the audio signals received from the second mobile hands-free units 1200 via the audio mixing unit 1180 and then output them as a complete audio signal or it can distribute the received audio signals to different audio channels and output the respective audio channels. Thus, for example, one audio channel can be provided per second mobile hands-free unit 1200. Thus, for example, an audio channel specific playback can be accomplished for other subscribers of the conference who are not located in the same room but for example use the same system. Thus for example an acoustic impression of the seating order of the conference subscribers who are using the first and at least one second mobile hands-free unit can be imaged.

Optionally the information as to which audio channel is involved and therefore who is speaking can be output to the external subscribers of the conference.

Figure 4A:
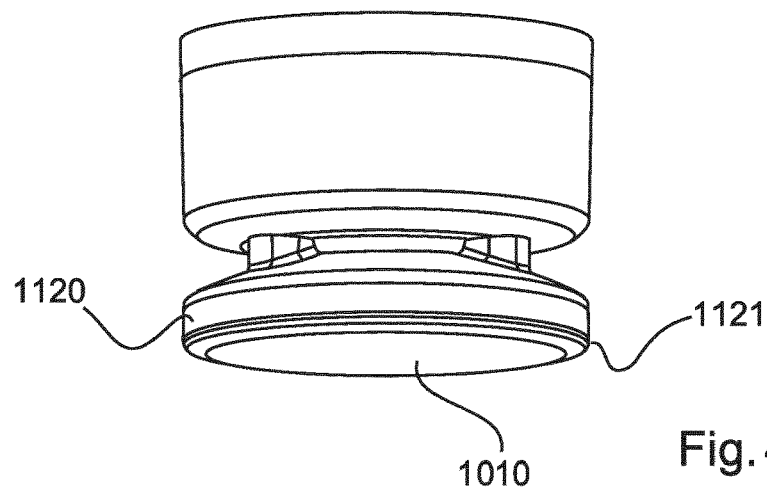
FIG. 4A-FIG. 4C show various views of a mobile hands-free unit according to a fourth exemplary embodiment of the invention.
Figure 4B:
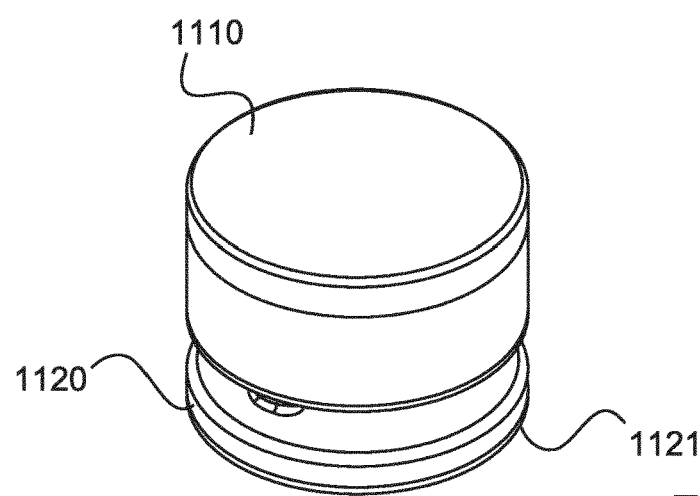
Figure 4C:
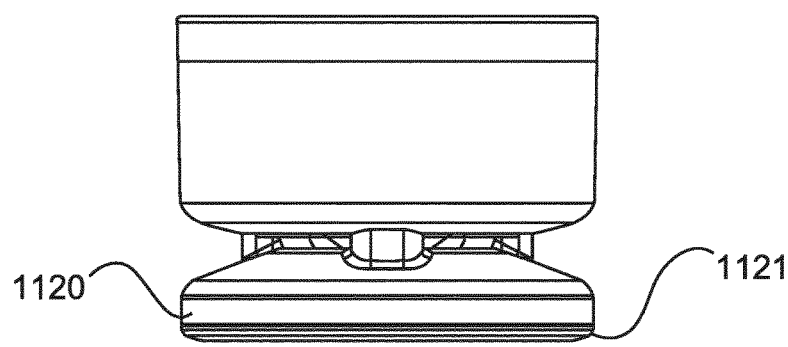

FIG. 4A-FIG. 4C show various views of a mobile hands-free unit according to a fourth exemplary embodiment of the invention. In particular, the housing of the hands-free unit is shown in FIGS. 4A-4C. The housing shown in FIGS. 4A-4C is the same for the first and also the second mobile hands-free unit 1100, 1200. The mobile hands-free unit 1100, 1220 has a base unit 1120 with a lighting unit 1121, for example, in the form of a lighting ring. A battery 1010 can be provided in or on the base unit 1120. An operating unit 1110 can be provided on the upper side of the mobile hands-free unit 1100, 1200. The operating unit 1110 can for example be configured as a touchpad. The operating unit 1110 can have a lighting unit 1111, an operating element for the loudness 1112, an operating element for a muting 1130 as well as an operating element for the pairing 1114.

The same applies to the second mobile operating unit 1200. This can also have a base unit 1220 with a lighting ring 1221 and a battery 1010.

Figure 5A:
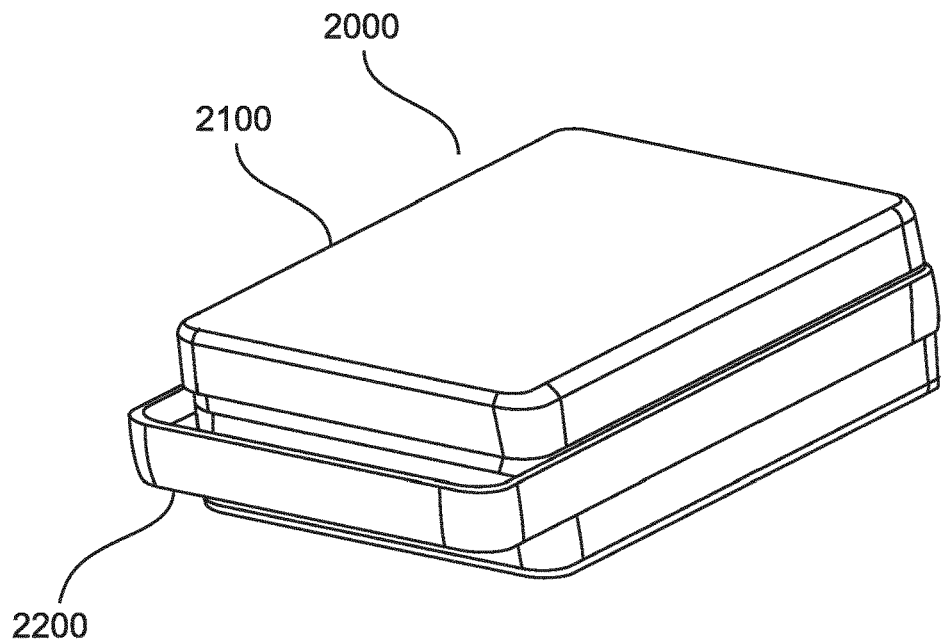
FIG. 5A-FIG. 5C each show various views of a charging and storage unit according to a fourth exemplary embodiment of the invention.
Figure 5B:
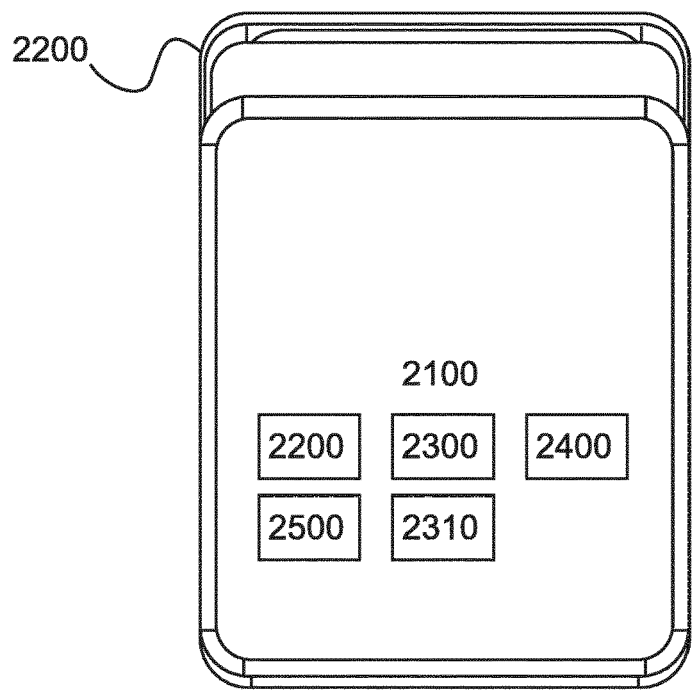
Figure 5C:
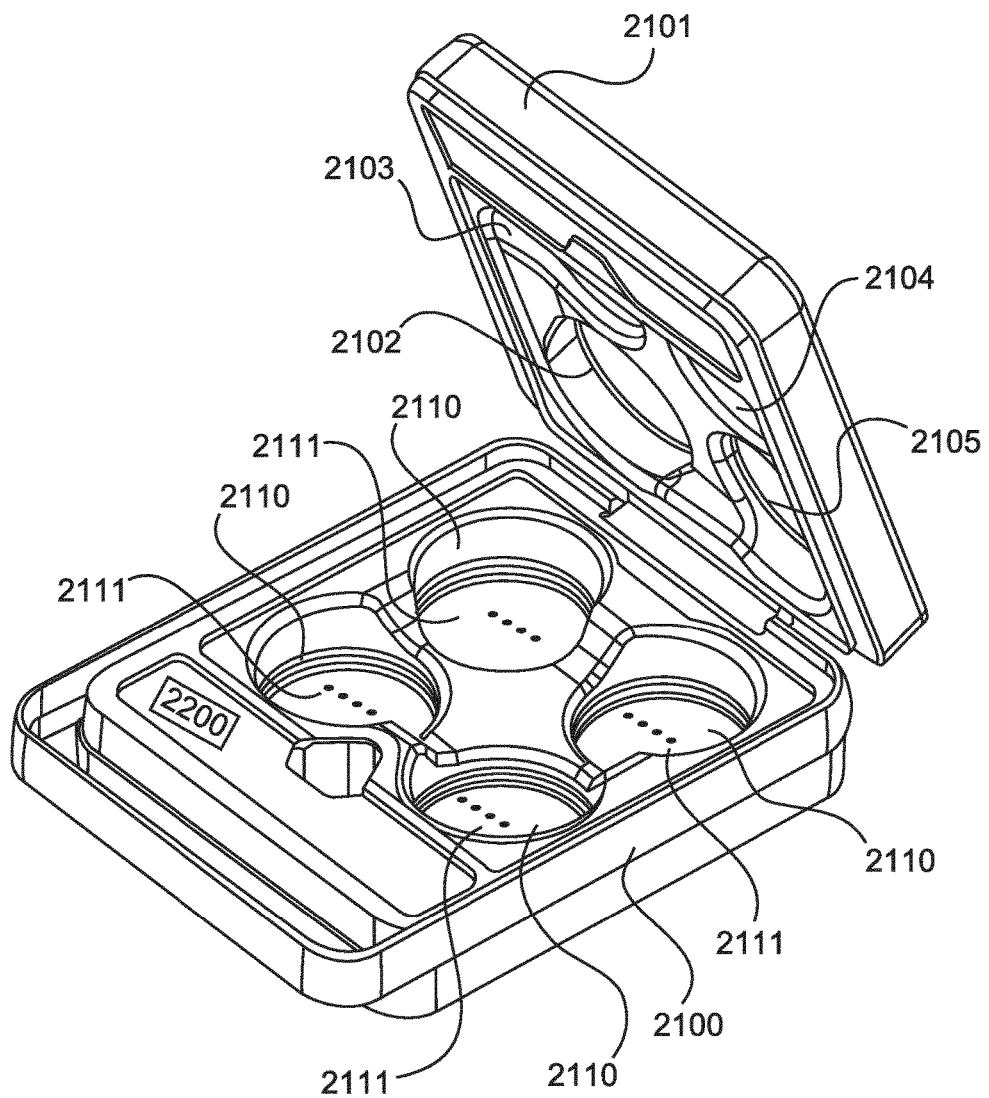

FIGS. 5A-5C each show various views of a charging and storage unit 2000 for the mobile hands-free units according to the invention. The charging and storage unit 2000 has a case 2100 with a carrying handle 2200. The case 2100 has a number of charging slots 2110 which each have electrical charging contacts 2111. These electrical charging contacts 2111 can for example be formed by four electrically conductive and optionally spring-mounted pins 2111. The mobile hands-free units 1100, 1200 can be placed in the charging slots 2110 for storage and charging. In particular, the mobile hands-free units 1100, 1200 with their base unit and the batteries 1010 placed therein can be placed in the charging slots 2110 so that the charging pins 2111 are in electrical contact with the charging contacts of the battery unit.

The electrical charging contacts 2111 are not only used for charging the battery unit 1010 of the mobile hands-free unit 1100, 1200 but also for data exchange between the mobile hands-free units 1100, 1200 and the storage and charging unit 2000. Thus, for example data relating to the charging state of the battery unit 1010 can be exchanged with the storage and charging unit. Furthermore, by means of the charging contacts a charging of the battery unit and also an energy flow in the other direction, namely from the battery unit to the charging and/or storage unit 2000 can be accomplished.

Optionally the charging and/or storage unit 2000 has its own battery unit 2200. Furthermore the s charging and/or storage unit 2000 can have a control unit 2300 which controls a charging of the mobile hands-free units 1100, 1200 located in the charging slots 2110.

Optionally the charging and storage unit 2000 can further have a display unit 2400. The display unit 2400 can display the charging state of the mobile hands-free units 1100, 1200 located in the charging slots 2110. In particular, the operating time with which the mobile hands-free units can be operated as a result of the current charging of the battery units 1010 can be displayed by means of the display unit 2400. Thus, the maximum conference duration can be displayed.

According to one aspect of the present invention, the storage and charging unit is configured as a case with a lid.

The time remaining according to the invention can be determined on the display unit 2400 by means of the control unit 2300. To this end, the control unit 2300 can record the charging state of the batteries 1010 of the respective mobile hands-free units 1100, 1200 located in the charging slots 2110 and display the corresponding maximum time remaining on the display unit 2400. The charging and storage unit 2000 has an operating unit 2500 by means of which for example the display of the time remaining can be initiated.

The control unit 2300 can for example have a charge monitoring unit 2310 which records the charging state of the batteries of the mobile hands-free units 1100, 1200 located in the charging slots 2110, determines that charging state which is the lowest and displays a time remaining accordingly. In this case, that time remaining can be displayed which enables a complete operation of the conference system with all the mobile hands-free units. The battery unit 2200 is optional. If this is not provided, the charging and/or storage unit 2000 can extract the energy required for the control unit 2300 from the battery units 1010 of the mobile hands-free units 1100, 1200 located in the charging slots 2110. Optionally the energy required for the control unit 2300 can be extracted from that battery unit 1010 which has the highest charging state.

The charging contacts 2111 are designed so that an energy flow is possible in both directions.

If the charging case or the charging and/or storage unit 2000 is connected to an external energy source, for example to the energy supply network by means of a plug socket, the battery units 1010 of the mobile hands-free units 1100, 1200 located in the charging slots 2110 are charged. Optionally the control unit 2300 can then be supplied with energy via the external energy source, i.e. the control unit 2300 is then optionally not supplied with energy via the battery units 1010 located in the case.

According to the invention, upon activation of the time remaining display a display unit 1105 in the operating unit 1110 can also be activated. The time remaining of the respective mobile hands-free unit 1100, 1200 can then be displayed on this display unit 1105. Thus, when the charging case is open, the user can immediately identify the charging state of the batteries of the mobile hands-free units 1100, 1200 which are placed in the charging slots 1110. Thus, a user can select those mobile hands-free units which have the highest charging state.

The display unit 2400 can be provided externally on the charging and/or storage unit 2000 so that a user receives information relating to the charging state of the mobile hands-free units 1100, 1200 located in the charging and/or storage unit 2000 in a rapid and simple manner. To this end he therefore does not need to open the charging case.

If the first mobile hands-free unit 1100 is not placed in the charging and/or storage unit 2000, this can be displayed via the display unit 2400. For example, an optical warning can be provided in the form of flashing organic LEDs.

Optionally it can be displayed via the display unit 2400 if the charging slots 1110 are not fully occupied. This can be accomplished, for example, so that the lowest battery charging state is displayed and this display flashes.

According to the invention, the mobile hands-free units 1100, 1200 can be configured to be round have circular charging contacts at their bottom so that the contacts can readily be placed on the charging pins 2111. Here it is then not a question of an exact rotational positioning since the charging contacts 2111 always impinge upon a relevant circular charging contact.

Optionally the charging slots 2110 are preferably cylindrically configured so that they can at least receive the lower end or the base unit of the mobile hands-free units 1100, 1200. The charging pins 2111 can for example be spring-loaded.

Figure 6A:
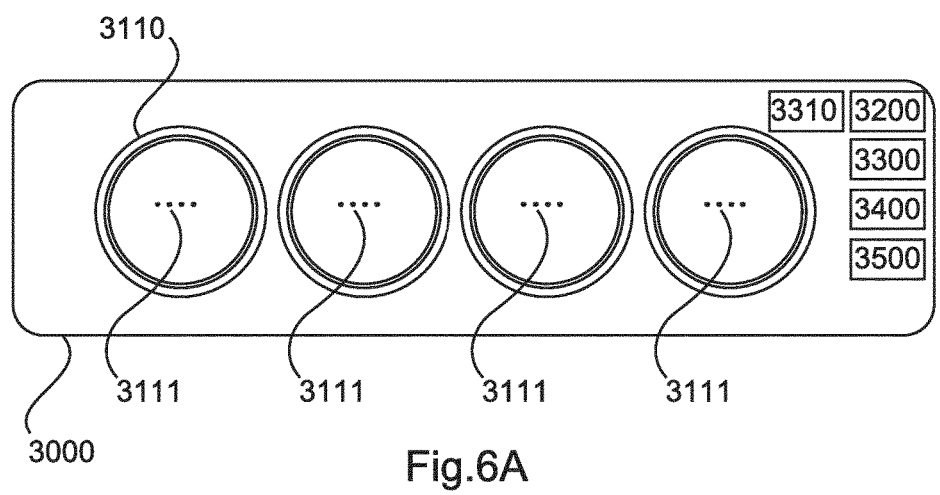
FIGS. 6A and 6B each show various views of a charging unit for the mobile hands-free unit according to the invention.
Figure 6B:
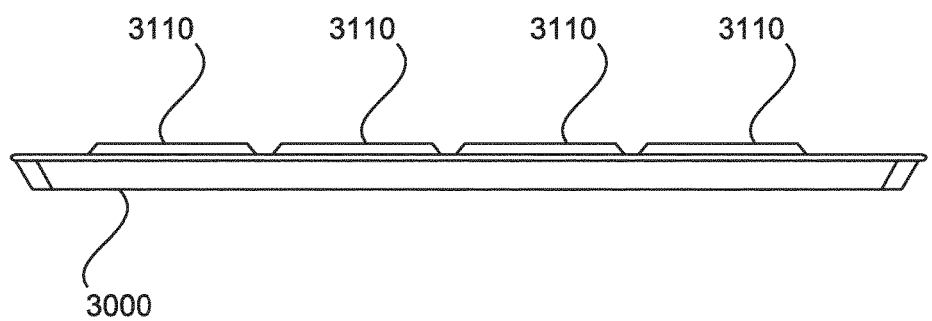

FIGS. 6A and 6B each show various views of another charging unit for the hands-free units according to the invention. In FIGS. 6A and 6B a charging unit 3000 is provided with four charging slots 3110 for the hands-free units 1100, 1200. Charging contacts 3111 are provided in each charging slot 3110.

The electrical charging contacts 3111 can for example be formed by four electrically conductive and optionally spring-mounted pins 3111. The mobile hands-free units 1100, 1200 can be placed in the charging slots 3110 for storage and charging. In particular, the mobile hands-free units 1100, 1200 with their base unit and the batteries 1010 placed therein are placed in the charging slots 3110 so that the charging pins 3111 are in electrical contact with the charging contacts of the battery unit.

The electrical charging contacts 3111 are not only used for charging the battery unit 1010 of the mobile hands-free unit 1100, 1200 but also for data exchange between the mobile hands-free units 1100, 1200 and the charging unit 3000. Thus, for example data relating to the charging state of the battery unit 1010 can be exchanged with the charging unit. Furthermore, both a charging of the battery unit and also an energy flow in the different direction, namely from the battery unit to the charging and/or storage unit 3000 can also be accomplished by means of the charging contacts.

Optionally the charging unit 3000 has its own battery unit 3200. Furthermore the charging and/or storage unit 3000 can have a control unit 3300 which controls a charging of the mobile hands-free units 1100, 1200 located in the charging slots 3110.

Optionally the charging unit 3000 can furthermore have a display unit 3400. The display unit 3400 can display the charging state of the mobile hands-free units 1100, 1200 located in the charging slots 3110. In particular that operating time can be displayed by means of the display unit 3400 with which the mobile hands-free units can be operated as a result of the current charge of the battery units 1010. Thus, the maximum conference time can be displayed.

The time remaining according to the invention on the display unit 3400 can be determined by means of the control unit 3300. To this end, the control unit 3300 can record the charging state of the batteries 1010 of the respective mobile hands-free units 1100, 1200 located in the charging slots 3110 and display the corresponding maximum time remaining on the display unit 3400. The charging and/or storage unit 3000 has an operating unit 3500 by means of which for example the display of the time remaining can be initiated.

The control unit 3300 can for example have a charge monitoring unit 3310 which records the charging state of the batteries of the mobile hands-free units 1100, 1200 located in the charging slots 3110, determines that charging state which is lowest and accordingly displays a time remaining. In this case, that time remaining which enables a complete operation of the conference system with all mobile hands-free units. The battery unit 3200 is optional. If this is not provided, the charging unit 3000 can extract the energy required for the control unit 3300 from the battery units 1010 of the mobile hands-free units 1100, 1200 located in the charging slots 3110. Optionally the energy required for the control unit 3300 can be extracted from that battery unit 1010 which has the highest charging state.

The charging contacts 3111 are designed so that an energy flow is possible in both directions.

If the charging unit 3000 is connected to an external energy source, for example to the energy supply network by means of a plug socket, the battery units 1010 of the mobile hands-free units 1100, 1200 located in the charging slots 3110 are charged. Optionally the control unit 3300 can then be supplied with energy via an external energy source, i.e. optionally the control unit 3300 is then not supplied with energy via the battery units 1010 located in the charging unit 3000.

According to the invention, upon activation of the time remaining display a display unit 1105 in the operating unit 1110 can also be activated. The time remaining of the respective mobile hands-free unit 1100, 1200 can then be displayed on this display unit 1105. Thus, the user can identify the charging state of the batteries of the mobile hands-free units 1100, 1200 which are placed in the charging slots 1110. Thus, a user can select those mobile hands-free units which have the highest charging state.

The display unit 3400 can be provided externally on the charging unit 3000 so that a user receives information relating to the charging state of the mobile hands-free units 1100, 1200 located in the charging unit 3000 in a rapid and simple manner.

If the first mobile hands-free unit 1100 is not placed in the charging unit 3000, this can then be displayed via the display unit 3400. For example, an optical warning can be provided in the form of flashing organic LEDs.

Optionally it can be displayed via the display unit 3400 if the charging slots 1110 are not fully occupied. This can be accomplished, for example, so that the lowest battery charging state is displayed and this display flashes.

According to the invention, the battery units 1010 can be configured to be round have circular charging contacts at their bottom so that these can readily be placed on the charging pins 3111. Here it is then not a question of an exact rotational positioning since the charging contacts 3111 always impinge upon a relevant circular charging contact.

Optionally the charging slots 3110 are preferably cylindrically configured so that they can at least receive the lower end or the base unit of the mobile hands-free units 1100, 1200. The charging pins 3111 can for example by spring-mounted.

According to one aspect of the present invention, a mobile conference system is provided with a plurality of mobile hands-free units. One of the mobile hands-free units functions as master whilst the other mobile hands-free units function as satellites or slaves. The master hands-free unit can also be seen as a central unit. The basic function of this central unit consists in producing an audio contact to at least one external communication partner and playing back the received audio signals and outputting recorded audio signals to the external communication partners. The connection to an external communication partner can be made via a fixed network connection, a telephone connection or the like. The central unit or the master hands-free unit optionally does not make the communication connection itself but serves as an audio input/output unit, for example, in the sense of a hands-free unit. The communication between the master hands-free unit and a telephone can be made for example on the basis of a Bluetooth connection. Thus, the master hands-free unit such as a Bluetooth headset is connected to a mobile telephone or smart telephone.

The mobile conference system furthermore has at least one slave hands-free unit which also has a microphone and a playback converter and is connected wirelessly to the master hands-free unit for bidirectional audio transmission. Optionally a master hands-free unit and three slave hands-free units can be provided in the mobile conference system. These are used for audio playback and audio recording in a good quality. With a larger conference table, for example the master hands-free unit and a number of slave hands-free units can be optimally placed.

The mobile conference system has a charging and/or storage unit for charging and storing or transporting the respective hands-free units. The mobile conference system is therefore easy to transport and can be put into operation immediately without major installation expenditure and without any cabling at a conference location. No infrastructure which must be installed at the conference location is required. Both the master hands-free unit and also the slave hands-free units have a battery unit for the energy supply. For operation of the mobile conference system only the first hands-free unit (master) and the second hands-free unit (slave) must be placed on a conference table. A user can register the first hands-free unit (master) on his smartphone or mobile telephone as headset for a Bluetooth communication. Optionally this can be accomplished by means of a NFC near field communication pairing. Thus, the user makes a telephone connection via his smartphone to start a telephone conference. The audio signals received by the smartphone are played back by the loudspeakers of the first hands-free unit (master) and also the loudspeakers of the second hands-free units (slaves). The audio signals recorded by the microphones of the first hands-free unit and also by the microphones of the second hands-free units are combined in the first hands-free unit and transmitted to the mobile telephone.

The mobile conference system has a charging and storage unit in the form of a charging case which is configured both for transporting and also charging the batteries of the first and second mobile hands-free unit. The charging case can be connected to an external energy source such as for example to a plug socket for charging the mobile hands-free units. The mobile hands-free units can each be placed in a charging slot and charged accordingly. The charging contacts of the charging case and the electrical contacts of the battery units enable an energy transmission in both directions and a data transmission in both directions.

Typically upon initiation of the mobile conference system the first mobile hands-free unit and the desired number of second mobile hands-free units are removed from the case and placed on the conference table. Optionally the mobile hands-free unit can be activated upon removal from the case.

According to one aspect of the present invention second mobile hands-free units (slave, satellite) can also be registered during operation of the mobile conference system and thus switched to the mobile conference system for this purpose. This can be controlled by the control unit 1170 of the first hands-free unit 1100 and in particular by the slave synchronization unit 1175. To this end, for example one of the second mobile hands-free units can be removed from the charging case and placed on the conference table. In so doing the second mobile hands-free unit 1200 makes contact with the central unit via the wireless interface and registers there. Then the control unit 1170 of the first mobile hands-free unit can activate the newly added second mobile hands-free unit without interrupting the conference. In particular the second hands-free unit 1200 receives audio signals from the first hands-free unit and transmits audio signals to the first hands-free unit 1100. If a new second hands-free unit should be added to the mobile conference, the first hands-free unit must receive the audio signals from the new second hands-free unit and mix these with the other audio signals from the other second hands-free units. Furthermore the first hands-free unit must also distribute the audio signals received from the external unit to the new second hands-free unit. In addition, upon activation of the newly added second mobile hands-free unit 1200, an exchange of control signals can take place between the first hands-free unit 1100 and the newly added second hands-free unit 1200 in order to transmit a state of the entire system to the newly added second hands-free unit. If the system is for example in the "muted" state, the newly registered second hands-free unit can adopt this state in the same way as the first hands-free unit and display this.

If optionally one of the second mobile hands-free units 1200 is no longer required, this can be deactivated without interrupting the conference. This can be advantageous for example if the energy in the battery of one of the second mobile hands-free units runs out during the conference. The second mobile hands-free unit can then switch itself off for example. Alternatively the communication can be ended if the second mobile hands-free unit is placed in the charging case. This can be recorded for example by the storage and charging unit 2000 and transmitted to the first mobile hands-free unit. Alternatively to this, this can be transmitted via the second mobile hands-free unit to the first mobile hands-free unit.

According to one aspect of the present invention, both the first and also the second mobile hands-free units 1100, 1200 are provided with a lighting unit 1121, 1221. The first and second mobile hands-free unit or the mobile conference system can have various operating modes. A first operating mode can be the connected operating mode (the connection between the master and the slaves is active), a second operating mode can be the non-connected operating mode (no connection exists), a third operating mode can be a muted conference (the hands-free units are muted) and a fourth operating mode can be a released conference. These four operating modes can be represented visually by means of the lighting units 1121, 1221. In this case, different light colours and different light durations or flashing of the light can be used. Thus, the corresponding operating mode, e.g. muted of the mobile conference system can be displayed to the user in a simple manner.

According to the invention control signals can be exchanged between the first mobile hands-free unit and the second mobile hands-free units, for example, via the control interface 1190. According to the invention, therefore the control unit 1170 and in particular the unit 1171 or the operating control unit 1176 and the lighting control unit 1177 can control both the operating mode and also the control of the lighting units 1121, 1221.

According to one aspect of the present invention, a synchronous flashing of the lighting units 1121, 1221 can be provided. This can be accomplished by means of the synchronous flashing unit 1171.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A mobile conference system comprising:
   a master mobile hands-free unit; and
   a first slave mobile hands-free unit;
   wherein each of the mobile hands-free unit comprise:
      at least one microphone configured to record audio signals;
      a loudspeaker configured to play back audio signals to be played back;
      a battery unit configured to supply energy;
      an operating unit;

a muting operating element,
a control interface configured to control wireless bidirectional transmission of control commands;
at least one lighting unit; and
a first transmitting/receiving unit configured to bidirectionally communicate wirelessly with another of the mobile hands-free units
wherein the master mobile hands-free unit further comprises:
a second transmitting/receiving unit configured to bidirectionally communicate wirelessly with an external unit;
wherein the master mobile hands-free unit is configured to:
receive first audio signals from the external unit by the second transmitting/receiving unit; and
wirelessly transmit the received first audio signals to the second mobile hands-free unit via the first transmitting/receiving unit;
wherein the master mobile hands-free unit is further configured to:
receive second audio signals from the second mobile hands-free unit by the first transmitting/receiving unit; and
mix the received second audio signals with recorded audio signals recorded by the at least one microphone of the master mobile hands-free unit; and
wirelessly transmit the mixed audio signals to the external unit via the second transmitting/receiving unit;
wherein the at least one second hands-free unit further comprises:
a muting operating element;
wherein the at least one second hands-free unit is configured to transmit, in response to an actuation of the muting operating element, a muting control command via the control interface of the at least one second hands-free unit to the control interface of the master mobile hands-free unit; and
wherein the master mobile hands-free unit is configured to interrupt, in response to receiving the muting control command, output of the audio signals recorded by its at least one microphone to the external unit via the second transmitting/receiving unit.

2. The mobile conference system according to claim 1;
wherein the master mobile hands-free unit further comprises;
a control unit configured to control an operation of a mobile conference;
wherein the control unit is configured to switch a second slave mobile hands-free unit coming new to a mobile conference, of the master and first slave mobile hands-free unit, into the mobile conference without interrupting the mobile conference so that the second slave mobile hands-free unit receives audio signals from the master mobile hands-free unit and transmits audio signals to the master mobile hands-free unit.

3. The mobile conference system according to claim 1;
wherein the master mobile hands-free unit further comprises:
a control unit configured to control the lighting units of the master and first slave hands-free units depending on an operating mode of the mobile conference system.

4. The mobile conference system according to claim 1;
wherein the master mobile hands-free unit further comprises:
a control unit configured to control a pairing of the master mobile hands-free unit with an external mobile telecommunications device;
wherein the operating unit of the master mobile hands-free unit is disposed on an upper side of the master mobile hands-free unit;
wherein the pairing is initiated by positioning the external mobile telecommunications device on the upper side of the master mobile hands-free unit; and
wherein the control unit is configured to deactivate the operating unit of the master mobile hands-free unit for the duration of the pairing process.

5. The mobile conference system according to claim 1, further comprising:
a charging and storage unit having:
a first charging slot; and
a second charging slot;
wherein the first charging slot is configured to charge the master hands-free unit and the second charging slot is configured to chare the first slave hands-free unit.

6. The mobile conference system according to claim 1, further comprising,
a charging and storage unit comprising:
a plurality of charging contacts in the form of charging pins configured to contact annular charging contacts of the battery units of the master or first slave mobile hands-free units.

7. The mobile conference system according to claim 6;
wherein the charging and storage unit further comprises:
a control unit configured to record charging states of the batteries of the master and first slave mobile hands-free units located in the charging slots and to display a corresponding maximum time remaining based on the recorded charging states.

8. The mobile conference system according to, claim 1;
wherein each of the battery units has exposed annular charging contacts.

* * * * *